United States Patent
Chidambaram Nachiappan et al.

(10) Patent No.: US 10,963,172 B2
(45) Date of Patent: Mar. 30, 2021

(54) SYSTEMS AND METHODS FOR PROVIDING A BACK PRESSURE FREE INTERCONNECT

(71) Applicant: Apple Inc., Cupertino, CA (US)

(72) Inventors: Nachiappan Chidambaram Nachiappan, Santa Clara, CA (US); David L. Trawick, Austin, TX (US); Yiu Chun Tse, Cupertino, CA (US); Deniz Balkan, Santa Clara, CA (US); Hengsheng Geng, Austin, TX (US); Shawn Munetoshi Fukami, Newark, CA (US); Jaideep Dastidar, San Jose, CA (US); Benjamin K. Dodge, San Jose, CA (US); Vinodh R. Cuppu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 16/059,766

(22) Filed: Aug. 9, 2018

(65) Prior Publication Data

US 2020/0050379 A1 Feb. 13, 2020

(51) Int. Cl.
| | |
|---|---|
| G06F 3/06 | (2006.01) |
| G06F 13/16 | (2006.01) |
| H04W 72/04 | (2009.01) |
| H04W 28/02 | (2009.01) |
| H04L 12/853 | (2013.01) |

(52) U.S. Cl.
CPC ........ *G06F 3/0631* (2013.01); *G06F 13/1663* (2013.01); *H04L 47/2416* (2013.01); *H04W 28/0257* (2013.01); *H04W 72/0453* (2013.01); *G06F 2209/503* (2013.01); *G06F 2209/5019* (2013.01); *G06F 2212/1016* (2013.01)

(58) Field of Classification Search
CPC ............... G06F 3/0631; G06F 13/1663; G06F 2209/5019; G06F 2212/1016; G06F 2209/503; H04L 47/2416; H04W 28/0257; H04W 72/0453
See application file for complete search history.

(56) References Cited

U.S. PATENT DOCUMENTS

| | | | |
|---|---|---|---|
| 6,209,041 B1 * | 3/2001 | Shaw ..................... | G06F 9/5016 719/321 |
| 7,477,600 B1 * | 1/2009 | Mor ..................... | H04L 41/0843 370/231 |

(Continued)

*Primary Examiner* — Francisco A Grullon
(74) *Attorney, Agent, or Firm* — Kowert Hood Munyon Rankin and Goetzel PC; Rory D. Rankin (57) ABSTRACT

A system and method for efficiently allocating data storage to agents. A computing system includes an interconnect with intermediate buffers for storing transactions and corresponding payload data during transport between sources and destinations. A data storage limit is set on an amount of data storage corresponding to outstanding transactions for each of the multiple sources based on the initial buffer assignments. A number of outstanding transactions for each of the multiple sources is limited based on a corresponding data storage limit. If the rate of allocation of a given buffer assigned to a first source exceeds a threshold, then a second source is selected with available space exceeding a threshold in an assigned buffer. If it is determined the second source is not assigned to a buffer with a rate of allocation exceeding a threshold, then buffer storage is reassigned from the second source to the first source.

20 Claims, 7 Drawing Sheets

(56) References Cited

U.S. PATENT DOCUMENTS

| | | | |
|---|---|---|---|
| 7,904,689 B1* | 3/2011 | Carothers | G06F 16/1737 |
| | | | 711/170 |
| 9,251,108 B2 | 2/2016 | Bass et al. | |
| 9,313,143 B2* | 4/2016 | Kottomtharayil | H04L 12/66 |
| 9,603,146 B1 | 3/2017 | Vivanco | |
| 9,652,766 B1 | 5/2017 | Hattikudru et al. | |
| 2009/0094359 A1* | 4/2009 | McDonnell | H04L 47/27 |
| | | | 709/224 |
| 2011/0225312 A1* | 9/2011 | Liu | H04N 21/632 |
| | | | 709/231 |
| 2013/0151778 A1* | 6/2013 | Daly | G06F 12/0897 |
| | | | 711/122 |
| 2014/0101379 A1* | 4/2014 | Tomlin | G06F 12/0246 |
| | | | 711/103 |
| 2014/0362698 A1* | 12/2014 | Arad | H04W 16/04 |
| | | | 370/235 |
| 2015/0277767 A1* | 10/2015 | Hamano | G06F 3/0631 |
| | | | 711/114 |
| 2018/0275923 A1* | 9/2018 | Earhart | G06F 3/0659 |
| 2019/0205269 A1* | 7/2019 | Fleming, Jr. | G06F 13/1673 |

* cited by examiner

SYSTEMS AND METHODS FOR PROVIDING A BACK PRESSURE FREE INTERCONNECT

BACKGROUND

Technical Field

Embodiments described herein relate to the field of computing systems and, more particularly, to efficiently allocating data storage to agents.

Description of the Related Art

Systems on chips (SoCs) are becoming increasingly complex with ever increasing numbers of agents within a typical SoC and available endpoints. The agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect transports transactions from a source, such as an agent, to a destination such as another agent or an endpoint. In some cases, the interconnect is a communication fabric. If the destination is already busy with other activities, after some time, the source begins experiencing back pressure as the intermediate buffers within the communication fabric fill up. Typically, the source handles the back pressure by stopping its corresponding compute or data pipeline until the intermediate buffers have available data storage again. For example, the source receives credits again to push transactions. However, in the meantime, a performance bottleneck is created.

In view of the above, efficient methods and mechanisms for efficiently allocating data storage to agents are desired.

SUMMARY

Systems and methods for efficiently allocating data storage to agents are contemplated. In various embodiments, a computing system includes a communication fabric (or fabric) for routing traffic among one or more agents and one or more endpoints. In some embodiments, the fabric includes one or more intermediate buffers for storing transactions and corresponding payload data during transport. In an embodiment, the one or more intermediate buffers are located in one or more data stores in the fabric such as an upstream data store and a downstream data store. Each agent and each endpoint is both a source and a destination for transactions depending on the direction of traffic flow through the fabric.

The intermediate buffers have available data storage assigned to the sources such as the agents and endpoints. A data storage limit is set on an amount of data storage space that may be used by the sources such as the agents. The data storage limit is based on the initial buffer assignments. In some embodiments, the data storage limit is measured as a data size. In other embodiments, the data storage limit is measured as a number of entries in the buffers. In another embodiment, the data storage limit is measured as a number of outstanding transactions for each of the multiple sources. In some embodiments, data storage is measured in terms of a number of entries of a buffer. In such embodiments, each entry of the buffer may be sized to accommodate a maximum amount of data for a given transaction and a number of transactions may serve as a proxy for an amount of space.

The computing system receives a workload and processes instructions, commands and routines corresponding to the workload. Particular characteristics of the computing system are used to determine whether a reassignment of buffer data storage occurs. For example, an indication of new task assignments from the operating system scheduler and an indication of new power-performance states for the components in the computing system are used.

In some embodiments, a difference is determined between bandwidth requirements of a first source and a corresponding destination. A rate of allocation of an intermediate buffer assigned to the first source is determined based on the difference. If the rate of allocation exceeds a threshold, then a second source is selected with available space exceeding a threshold in an assigned buffer. If it is determined the second source is not assigned to a buffer with a rate of allocation exceeding a threshold, then the priority of the second source is checked. For example, real-time sources are not initial candidates to provide extra data storage from assigned buffers. If the priority of the second source is below a threshold, then buffer storage is reassigned from the second source to the first source. In an embodiment, the amount of reassigned data storage is based on an estimation of an amount of data storage needed with the upcoming new task assignments.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
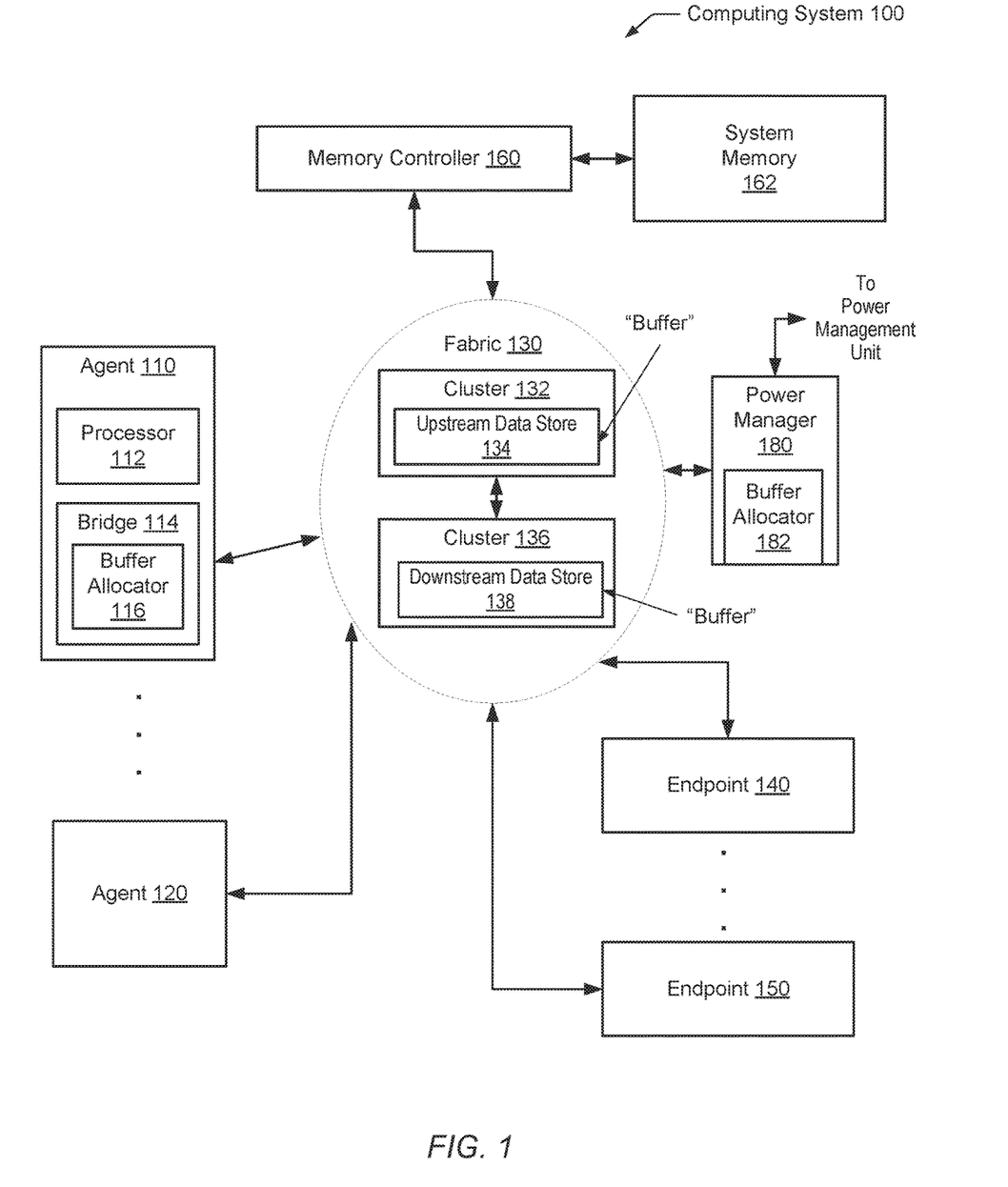
FIG. 1 is a block diagram of one embodiment of a computing system.

Referring to FIG. 1, a generalized block diagram of one embodiment of a computing system 100 is shown. In the illustrated embodiment, fabric 130 routes traffic among agents 110-120 and endpoints 140-150. In some embodiments, one or more of upstream data store 134 and downstream data store 138 is used to store one or more intermediate buffers for storing data flowing between agents 110-120, endpoints 140-150, and system memory 162 via memory controller 160. The "traffic" flowing through fabric 130 refers to one or more of access requests, messages, and data corresponding to the access requests and the messages. In various embodiments, upstream data store 134 and downstream data store 138 include data storage space for storing data corresponding to the access requests and the messages. In some embodiments, upstream data store 134 stores write data being sent from agents 110-120 to system memory 162 via memory controller 160.

In some embodiments, downstream data store 138 stores read response data sent from memory controller 160 to agents 110-120. Additionally, in some embodiments, downstream data store 138 stores write data for asynchronous write requests traversing memory controller 160, which is used as a single ordering point. In various embodiments, upstream data store 134 and downstream data store 138 are referred to as buffers, which are used for storing data corresponding to commands and messages. In an embodiment, buffer allocator 182 assigns buffer data storage space in these buffers in fabric 130 to agents 110-120 and endpoints 140-150. Additionally, in some embodiments, buffer allocator 182 reassigns buffer data storage space fabric 130 in these buffers based on an indication of a current or upcoming workload.

In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC), or an apparatus. In other embodiments, the agents 110-120 and endpoints 140-150 are individual dies within a package such as a multi-chip module (MCM). In yet other embodiments, the agents 110-120 and endpoints 140-150 are individual dies or chips on a printed circuit board.

Clock sources, such as phase lock loops (PLLs), interrupt controllers, and so forth are not shown in FIG. 1 for ease of illustration. It is also noted that the number of components of the computing system 100 vary from embodiment to embodiment. In other embodiments, there are more or fewer of each component than the number shown for the computing system 100. In an embodiment, each of the agents 110-120 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 112. Any instruction set architecture is implemented in various embodiments.

Each of the agents 110-120 includes a processor such as processor 112. Although a single processor is shown, in various embodiments, multiple processors are used, each with one or more processor cores. Processor 112 is one or more of a central processing unit (CPU), a data parallel processor like a graphics processing units (GPU), a digital signal processors (DSP), a multimedia engine, and so forth. In some embodiments, components within agent 120 are similar to components in agent 110. In other embodiments, components in agent 120 are designed for lower power consumption, and therefore, include control logic and processing capability producing less performance. In such embodiments, supported clock frequencies are less than supported clock frequencies in agent 110. In addition, one or more of the processor cores in agent 120 include a smaller number of execution pipelines and/or functional blocks for processing relatively high power consuming instructions than what is supported by the processor cores in agent 110.

In various embodiments, agents 110-120 and endpoints 140-150 transfer messages and data to one another through fabric 130. In various embodiments, fabric 130 includes a hierarchy of clusters between agents 110-120 and memory controller 160. Although two clusters 132 and 136 are shown, in other embodiments, any number of clusters is used. Between each hierarchical level of fabric hierarchy of fabric 130 are multiple links. Clusters 132 and 136 include control logic (not shown) for selecting transactions to send from a source to a destination. For example, multiple multiplexers (or muxes) are used. In such embodiments, agents 110-120 and endpoints 140-150 include fabric interface units. Different types of traffic flows independently through fabric 130. In some embodiments, fabric 130 utilizes a single physical fabric bus to include a number of overlaying virtual channels, or dedicated source and destination buffers, each carrying a different type of traffic. Each channel is independently flow controlled with no dependence between transactions in different channels. In other embodiments, the communication fabric is packet-based, and is hierarchical with bridges, cross bar, point-to-point, or other interconnects.

In various embodiments, fabric 130 uses one or more bus protocols for transferring messages and data, enforcing an order between transactions with particular transaction types, and ensuring cache coherence among the different agents 110-120 and endpoints 140-150. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth.

Endpoints 140-150 are representative of any number and type of components coupled to fabric 130. For example, in some embodiments, endpoints 140-150 include one or more cameras, flash controllers, display controllers, media controllers, graphics units, communication interfaces such as radio communication interfaces, and/or other devices. Endpoints 140-150 are also representative of any number of input/output (I/O) interfaces or devices and provide interfaces to any type of peripheral device implementing any hardware functionality included in computing system 100. For example, in an embodiment, any of the endpoints 140-150 connect to audio peripherals such as microphones, speakers, interfaces to microphones and speakers, audio processors, digital signal processors, mixers, etc. Other I/O devices include interface controllers for various interfaces external to computing system 100, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

In yet other embodiments, one or more of endpoints 140-150 include memory controllers for interfacing with system memory or separate memory such as a portable flash memory device. As shown, memory controller 160 is used to interface with system memory 162. Memory controller 160 includes any number of memory ports, generates proper clocking to memory devices, and interfaces to system memory 162. System memory 162 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

In various embodiments, power manager 180 controls the supply voltage magnitudes requested from the external power management unit. In some embodiments, one or more supply voltages generated by the external power management unit are provided to the components of the computing system 100. In some embodiments, logic local to various components control the power states of the components, including power up and power down and various other power-performance states (P-states) and operating modes for those components that support more than one P-state and operating mode. In various embodiments, the P-state is used to determine the operational voltage and operational frequency used by a component, whereas the operating mode determines how many sub-components are powered up such as particular execution pipelines.

In other embodiments, the power manager 180 controls power up and power down of other components of the computing system 100, or a combination of local control for some components and control by the power manager 180 for other components are supported. In an embodiment, the power manager 180 is under direct software control (e.g. software may directly request the power up and/or power down of components) and/or monitors the computing system 100 and determines when various components are to be powered up or powered down.

The external power management unit generally includes the circuitry to generate supply voltages and to provide those supply voltages to other components of the system such as the computing system 100, the off-die memory, various off-chip peripheral components (not shown in FIG. 1) such as display devices, image sensors, user interface devices, etc. In an embodiment, the external power management unit includes programmable voltage regulators, logic to interface to the computing system 100 and more particularly the power manager 180 to receive voltage requests, etc.

In some embodiments, data stored in upstream data store 134 and downstream data store 138 is stored in one or more of flip-flops or other types of registers, one of a variety of random access memory (RAM) cells, content addressable memory (CAM) structure, or other. Sources include any one of agents 110-120 and endpoints 140-150. In various embodiments, each of the sources has an initial amount of data storage space in one or more of upstream data store 134 and downstream data store 138 assigned to it. In some embodiments, buffer allocator 182 performs both the initial buffer assignments and later reassignments based on a current workload.

In some embodiments, buffer allocator 182 includes a combination of combinatorial logic and sequential elements for dynamically assigning buffer data storage space to sources in computing system 100 where the buffers are one or more of upstream data store 134 and downstream data store 138. In an embodiment, similar to the power manager 180, the buffer allocator 182 is under direct software control and/or monitors the computing system 100 and determines when buffer data storage reassignments should be performed. Although buffer allocator 182 is shown as a centralized block, in other embodiments, the functionality for dynamically reassigning intermediate buffer data storage is distributed among buffer allocator 182 and communication interface units in agents 110-120 and endpoints 140-150.

In various embodiments, buffer allocator 182 sets a data storage limit on an amount of data storage space in the buffers (one or more of upstream data store 134 and downstream data store 138) for each of the multiple sources based on the initial buffer assignments. In some embodiments, an amount of available data storage space in the buffers (one or more of upstream data store 134 and downstream data store 138) is known to agent 110. In some embodiments, bridge 114 includes link interfaces for transferring data through fabric 130. Bridge 114 also includes buffer allocator 116 for managing an amount of data storage space in the buffers (one or more of upstream data store 134 and downstream data store 138) to be used for agent 110.

In various embodiments, buffer allocator 116 maintains buffer utilization and buffer allocation rate by agent 110 for the buffers (one or more of upstream data store 134 and downstream data store 138). In an embodiment, buffer allocator 116 maintains a buffer utilization by maintaining a ratio of an amount of data storage space that is to be occupied in the buffers by agent 110 to the amount of assigned data storage space in the buffers for agent 110. For example, in one embodiment, a value corresponding to the amount of data storage space that is to be occupied in the buffers by agent 110 is stored in a first register. A value corresponding to the amount of assigned data storage space in the buffers for agent 110 is stored in a second register. In other embodiments, other sequential elements other than registers are used. Control logic accesses the registers and determines the ratio for buffer utilization by dividing the value stored in the first register by the value stored in the second register. Control logic divides the value stored in the first register by a given period of time to determine the buffer allocation rate.

In some embodiments, the values stored in the first register and the second register are data size values are measured as a number of bytes, in one example. In other embodiments, the values stored in the first register and the second register are measured as a number of entries in the buffers (one or more of upstream data store 134 and downstream data store 138) for agent 110. In an embodiment, each entry includes a same amount of data storage space. In some embodiments, each entry includes data storage space of 128 bytes. Therefore, when one kilobyte of data storage space is reserved in the buffers for agent 110, the first register stores a value of 8 (8 entries times 128 bytes per entry is 1 kilobyte).

In some embodiments, bridge 114 translates memory access requests into smaller transactions. For example, in an embodiment, bride 114 translates a write request for 1 kilobyte (KB) into eight write transactions, each with a 128 byte data size. Therefore, buffer allocator 116 in agent 110 is aware of an amount of available data storage space that is to be occupied by outstanding transactions. In some embodiments, when the data is accessed by memory controller 160 with a pull message from memory controller 160 to the upstream data store 134, one or more of the memory controller 160 and control logic in cluster 132 sends a message to agent 110. The message notifies buffer allocator 116 in agent 110 that the data is removed from the upstream data store 134. Therefore, buffer allocator 116 is able to update its local value of the buffer utilization in the upstream data store 134, and accordingly, the amount of available data storage space in the upstream data store 134 for agent 110. In some embodiments, the amount of data removed from the upstream data store 134 is removed from the value stored in the first register. As described earlier, this amount is measured as one of a data size measured in bytes, a number of entries in the buffers, a number of transactions or other.

A number of outstanding transactions for each of the multiple sources is limited based on a respective data storage limit. If the rate of allocation of a given buffer assigned to a first source exceeds a threshold, then a second source is selected. It is determined that the second source has available space exceeding a threshold in an assigned buffer (one or more of upstream data store 134 and downstream data store 138). If it is determined the second source is not assigned to a buffer with a rate of allocation exceeding a threshold, then buffer storage is reassigned from the second source to the first source.

Figure 2:
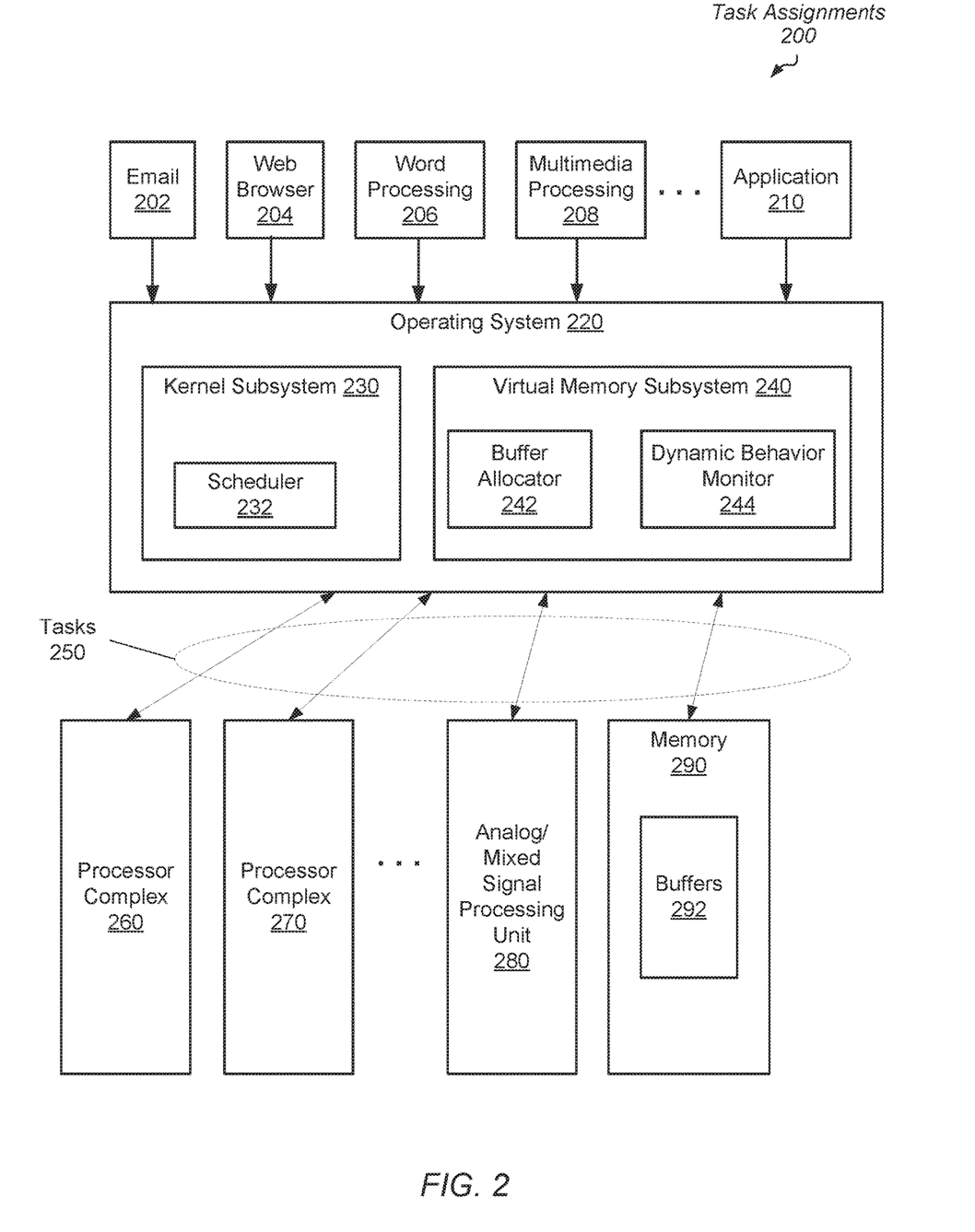
FIG. 2 is a block diagram of one embodiment of assigning tasks corresponding to one or more executing applications to hardware resources.

Turning to FIG. 2, a generalized block diagram illustrating one embodiment of task assignments 200 is shown. In the illustrated embodiment, operating system 220 assigns tasks corresponding to one or more executing applications to hardware resources. Operating system 220 is one of a variety of available operating systems. In some embodiments, a task is a software thread of execution, which is a subdivision of a software process. In other embodiments, a task is a transaction. A transaction includes an indication of a command for a particular operation, but the transaction does not include all of the resources of a thread or a process. In yet other embodiments, a non-transaction control signal is used to initiate the processing of steps of a given task. As shown, operating system 220 assigns tasks 250 corresponding to one or more executing applications of applications 202-210 to hardware resources.

As shown, applications include an email application 202, a web browser 204, a word processing application 206, a multimedia processing application 208, and so forth. Application 210 represents one of a variety of other applications executed for a user. In an embodiment, hardware resources include processor complex 260 and 270 in addition to analog/mixed signal processing unit 280. In other embodiments, a variety of other types of hardware resources are also available such as input/output (I/O) peripheral devices, a display controller, a camera subsystem, and so forth.

Although operating system 220 is shown externally from memory 290, in various embodiments, operating system 220 is stored in memory 290, and copies of portions of operating system 220 are sent to one of processor complexes 260 and 270 for execution. Memory 290 represents any of a variety of physical memory types such as synchronous DRAM (SDRAM), flash memory, disk memory, remote data storage devices, and so forth. In an embodiment, memory 290 utilizes a memory hierarchy such as a hierarchy used in a cache memory subsystem. Memory 290 uses one or more memory interfaces when communicating with the other hardware resources 260-280. In various embodiments, memory 290 stores source data for applications 202-210 in addition to result data and intermediate data generated during the execution of applications 202-210. Copies of the data is transferred between memory 290 and one or more caches within processing elements such as the hardware resources 260-280. In addition, buffers 292 are used to store intermediate data during the processing of applications 202-210. For example, buffers 292 includes one or more data stores and one or more queues within a communication fabric. Therefore, buffers 292 include data storage space for storing intermediate data during the processing of applications 202-210.

Operating system 220 detects which ones of the applications 202-210 are executing or are indicated to begin executing, and selects which ones of the hardware resources 260-280 to use for executing tasks 250 corresponding to the detected applications. In an embodiment, scheduler 232 within the kernel subsystem 230 includes control logic for assigning tasks to processing elements in the hardware resources 260-280. For example, scheduler 232 assigns tasks to particular processor cores within the processor complexes 260-270. Additionally, operating system 220 allocates regions of memory 290 for the execution. In various embodiments, buffer allocator 242 dynamically reassigns an amount of data storage in buffers 292 to the hardware resources 260-280.

In an embodiment, kernel subsystem 230 within operating system 220 allocates regions within memory 290 for processes corresponding to executing applications 202-210. Each process has at least a respective instance of instructions and data before application execution and an address space that addresses the code, data, and possibly a heap and a stack. Kernel subsystem 230 sets up an address space, such as a virtual address space, for each executing one of the applications 202-210, sets up a stack for the program, sets up a branch address pointing to a given location inside the application, and sends an indication to a selected hardware resource to begin execution one or more threads corresponding to the application.

In an embodiment, buffer allocator 242 is part of the virtual memory subsystem 240 within operating system 220. In various embodiments, the virtual memory subsystem 240 performs virtual memory management, handles memory protection, cache control, and bus arbitration. In another embodiment, buffer allocator 242 is software located externally from the virtual memory subsystem 240. In yet another embodiment, buffer allocator 242 is not located within virtual memory subsystem 240, but rather, buffer allocator 242 comprises hardware circuitry for implementing the algorithm for assigning data storage in buffer 292 to the hardware resources 260-280. In an embodiment, buffer allocator 242 is a separate application specific integrated circuit (ASIC) or another type of separate processing element. In yet other embodiments, the functionality of buffer allocator 242 is implemented in both hardware and software.

In some embodiments, buffer allocator 242 determines the assignment of data storage in buffers 292 to the hardware resources 260-280 based at least upon one or more reported factors from the dynamic behavior monitor 244. The reported factors are related to the dynamic behavior of the computing system. In some embodiments, the dynamic behavior monitor 244 receives and/or monitors and reports an incoming rate of tasks and a completion rate for tasks. In addition, a rate of allocation and a rate of deallocation of various buffers in buffers 292 are monitored. The difference between these two allocation rates indicates how much particular buffers in buffers 292 and corresponding hardware resources of resources 260-280 are being overburdened.

In one example, if the allocation rate is larger than the deallocation rate, then that particular buffer becomes filled up and causes the corresponding hardware resource to stop its corresponding compute or data pipeline until the intermediate buffer has available data storage again. For example, the hardware resource again receives credits to push transactions. However, in the meantime, a performance bottleneck is created. In an embodiment, dynamic behavior monitor 244 determines a difference between bandwidth requirements of a first source of hardware resources 260-280 and a corresponding destination. In another embodiment, the dynamic behavior monitor 244 reports the bandwidth requirements of the first source and the corresponding destination to the buffer allocator 242, which determines the difference. A rate of allocation of an intermediate buffer assigned to the first source is determined based on the difference.

If the rate of allocation determined by one of buffer allocator 242 and dynamic behavior monitor 244 exceeds a threshold, then buffer allocator 242 selects a second source of hardware resources 260-280 with available space exceeding a threshold in an assigned buffer in buffers 292. If it is determined the second source is not assigned to a buffer with a rate of allocation exceeding a threshold, then in an embodiment, the priority of the second source is checked. For example, in an embodiment, real-time sources are not initial candidates to provide extra data storage from assigned buffers. If the priority of the second source is below a threshold, then buffer allocator 242 reassigns buffer storage from the second source to the first source. In an embodiment, the amount of reassigned data storage is based on an estimation of an amount of data storage needed with the upcoming new task assignments.

Other factors reported by one or more of hardware resources 260-280, kernel subsystem 230 and dynamic behavior monitor 244 that indicate changes in bandwidth requirements of hardware resources 260-280 include availability of hardware resources 260-280 in the computing system, performance-power states (p-states) of hardware resources 260-280 and memory 290, target performance levels of tasks, measured performance levels of tasks and measured power consumption of one or more hardware resources 260-280 in the computing system. A variety of other factors are also possible and contemplated for use in determining the assignment of data storage in buffers 292 to hardware resources 260-280.

Figure 3:
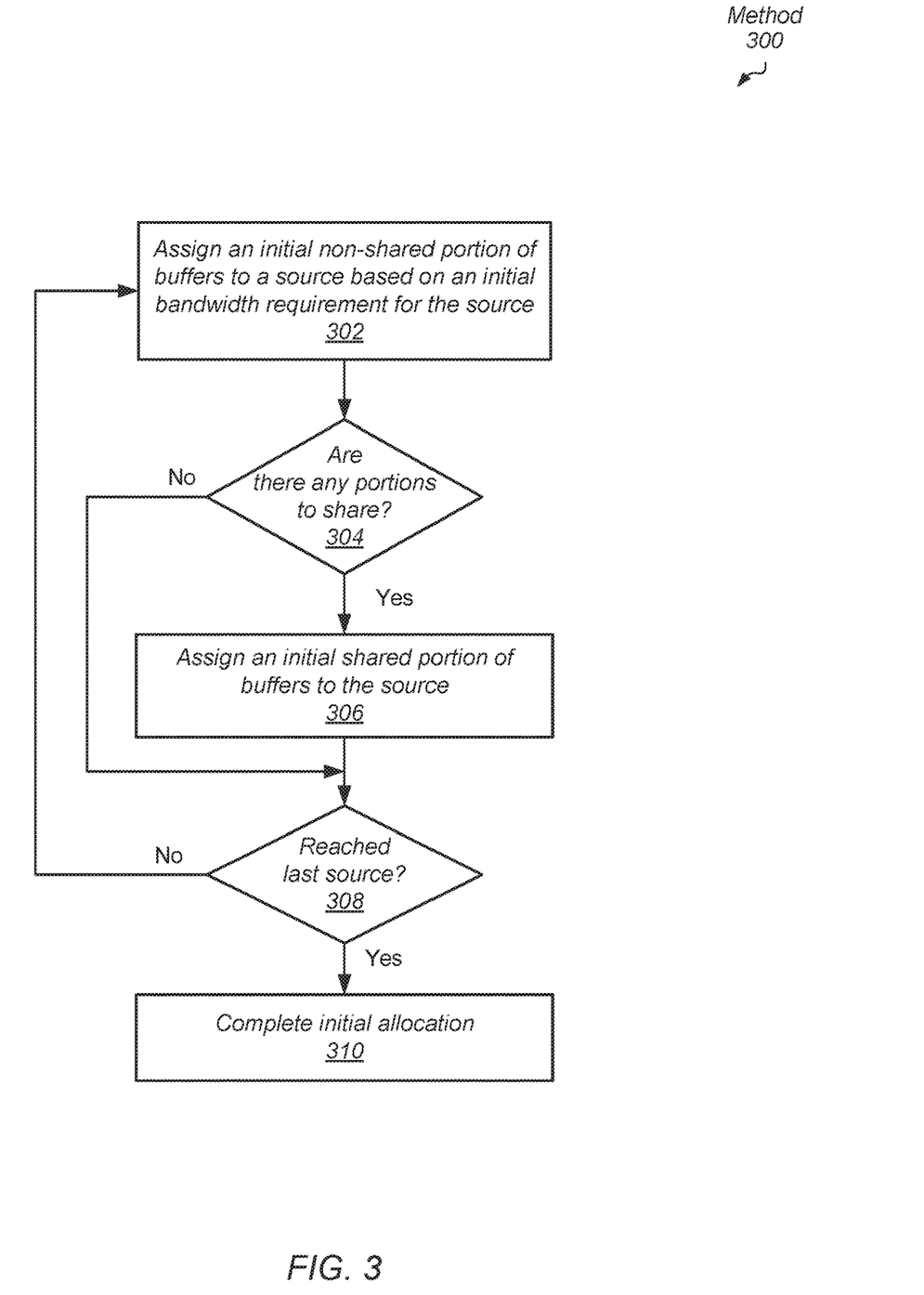
FIG. 3 is a flow diagram of one embodiment of a method for efficiently allocating data storage to agents.

Referring now to FIG. 3, a generalized flow diagram of one embodiment of a method 300 for efficiently allocating data storage to agents is shown. For purposes of discussion, the steps in this embodiment (as well as for FIGS. 4-5) are shown in sequential order. However, in other embodiments some steps may occur in a different order than shown, some steps may be performed concurrently, some steps may be combined with other steps, and some steps may be absent.

An initial non-shared portion of buffers (one or more of an upstream data store and a downstream data store in a fabric) or initial a non-shared complete buffer is assigned to a source based on an initial bandwidth requirement for the source (block 302). If there are any portions to share ("yes" branch of the conditional block 304), an initial shared portion of buffers is assigned to the source (block 306). If the last source is reached ("yes" branch of the conditional block 308), then the method for assigning buffers to sources completes (block 310). Otherwise, if the last source is not reached ("no" branch of the conditional block 308), then control flow of method 300 returns to block 302 where an initial non-shared portion of buffers is assigned to an upstream source based on an initial bandwidth requirement for the source.

Figure 4:
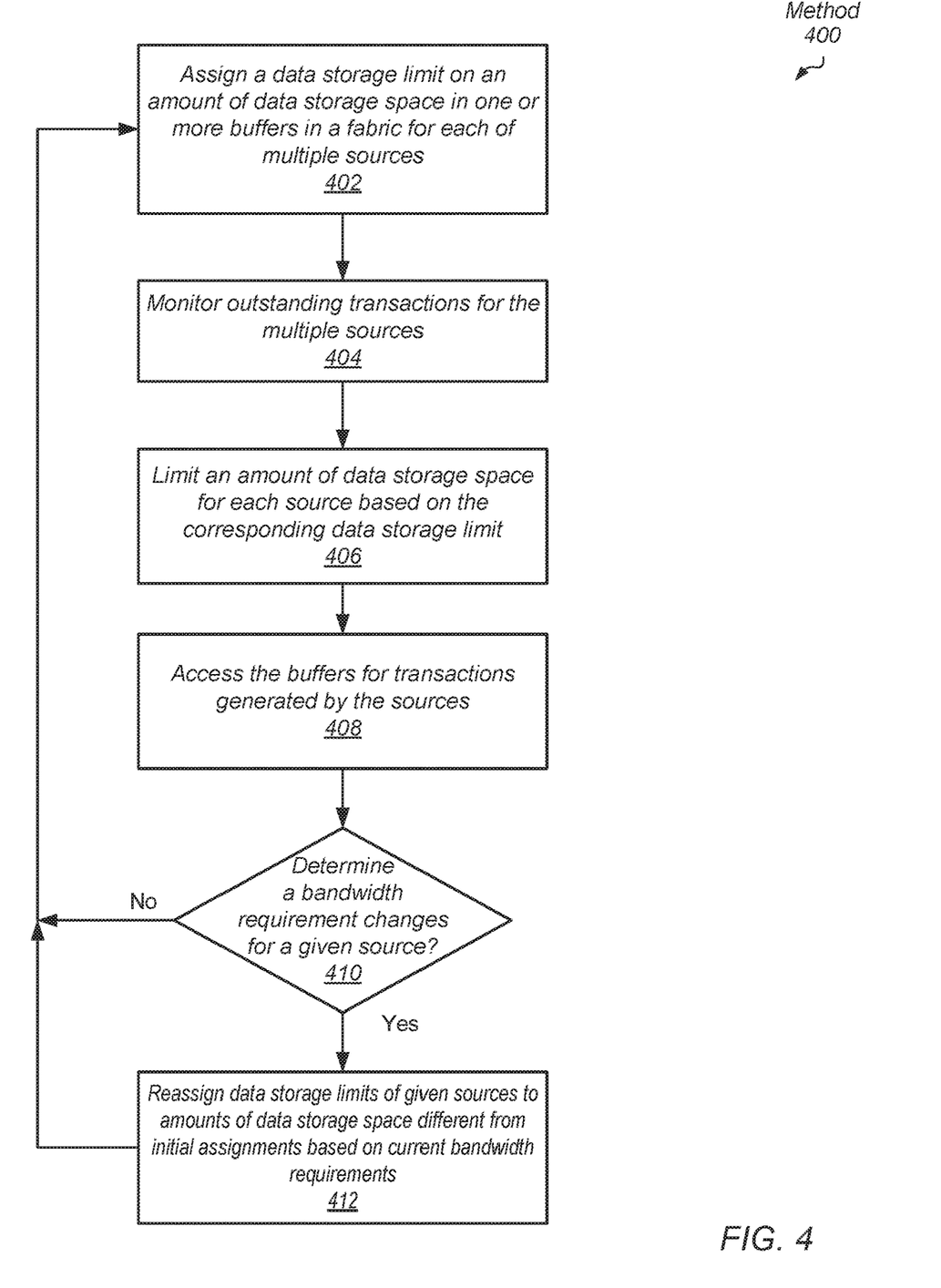
FIG. 4 is a flow diagram of one embodiment of a method for efficiently allocating data storage to agents.

Referring now to FIG. 4, a generalized flow diagram of one embodiment of a method 400 for efficiently allocating data storage to sources is shown. For each of multiple sources, an initial amount of data storage space in one or more buffers in a communication fabric that may be used by outstanding transactions is assigned as a data storage limit (block 402). In various embodiments, the one or more buffers are data storage space in one or more of an upstream data store and a downstream data store. Outstanding transactions for multiple sources are monitored (block 404). In some embodiments, the source monitors outstanding transactions in order to maintain a buffer utilization and a buffer allocation rate. In some embodiments, rather than monitor buffer utilization and allocation rate using a data size, agent 110 translates each access of data into a number of multiple transactions, each with a same data size. An amount of data storage space in the buffers for each source is limited based on a respective assigned data storage limit (block 406). In some embodiments, the data storage limit is measured as a data size. In other embodiments, the data storage limit is measured as a number of entries in the buffers. In another embodiment, the data storage limit is measured as a number of outstanding transactions for the source.

The buffers (one or more of upstream data store and downstream data store) for transactions generated by the sources are accessed based on the buffer portion assignments (block 408). If it is determined a bandwidth requirement, such as a number of outstanding transactions per a unit of time, changes for a given source ("yes" branch of the conditional block 410), then data storage limits of given sources are reassigned to amounts of data storage space different from initial assignments based on current bandwidth requirements (block 412). In an embodiment, the non-shared portions and any shared portions of buffers are reassigned to the multiple sources based on current bandwidth requirements.

Figure 5:
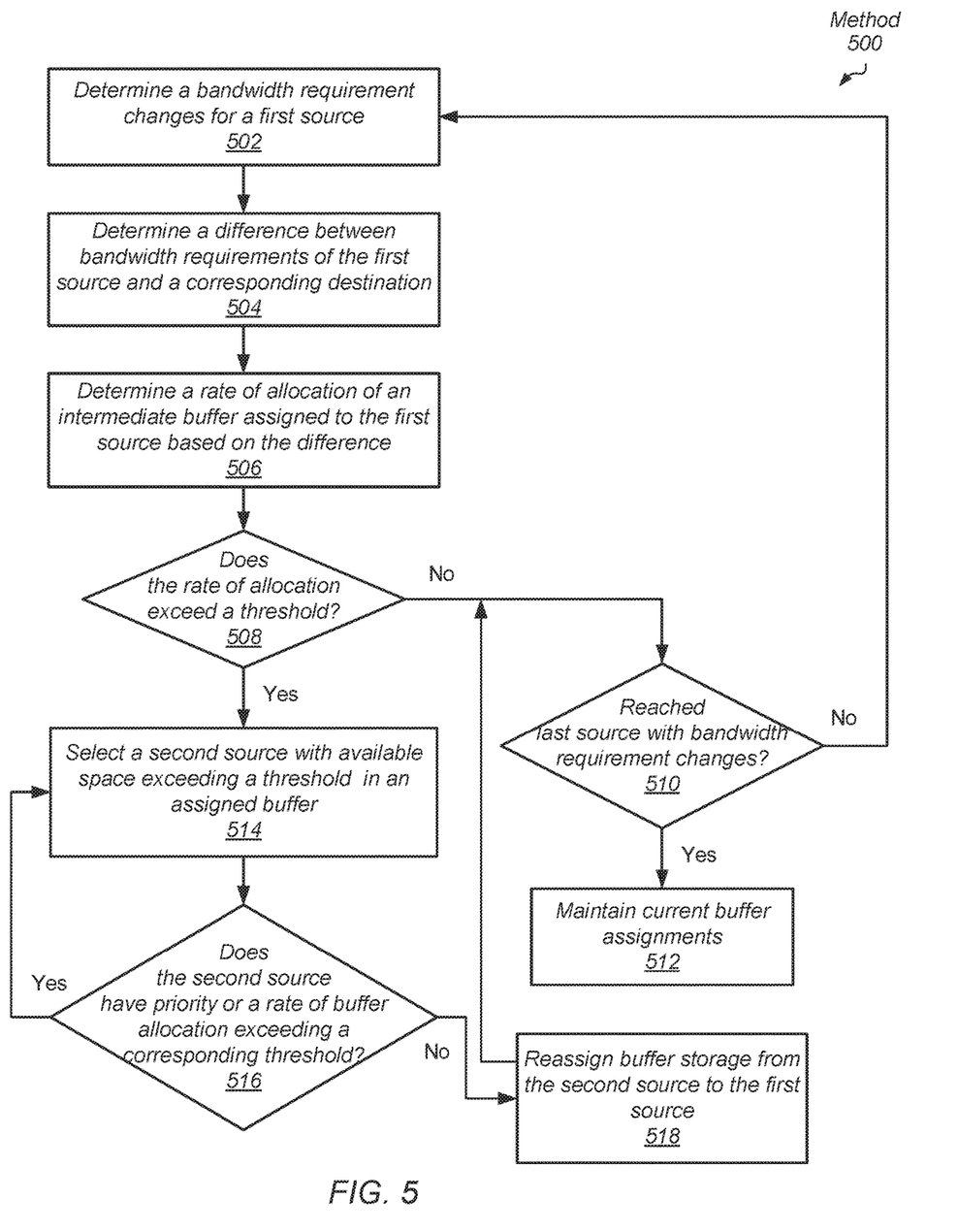
FIG. 5 is a flow diagram of one embodiment of a method for efficiently allocating data storage to agents.

Referring now to FIG. 5, a generalized flow diagram of one embodiment of a method 500 for efficiently allocating data storage to sources is shown. It is determined that a bandwidth requirement changes for a first source (block 502). A difference is determined between bandwidth requirements of the first source and a corresponding destination (block 504). A rate of allocation of an intermediate buffer assigned to the first source is determined based on the difference (block 506).

If the rate of allocation does not exceed a threshold ("no" branch of the conditional block 508), and the last source with bandwidth requirement changes has not been reached ("no" branch of the conditional block 510), then control flow of method 500 returns to block 502 where another source becomes the "first source" with a change in bandwidth requirement. As described earlier, following, a difference is determined between bandwidth requirements of the first source and a corresponding destination such as in block 504. However, if the last source with bandwidth requirement changes has been reached ("yes" branch of the conditional block 510), then the current buffer assignments are maintained (block 512).

If the rate of allocation exceeds a threshold ("yes" branch of the conditional block 508), then a second source is selected with available space exceeding a threshold in an assigned buffer (block 514). If the second source has priority or a rate of buffer allocation exceeding a corresponding threshold ("yes" branch of the conditional block 516), then control flow of method 500 returns to block 514 where another source indicated by "second source" is selected. If the second source does not have a priority or a rate of buffer allocation exceeding a corresponding threshold ("no" branch of the conditional block 516), then buffer storage is reassigned from the second source to the first source (block 518). In some embodiments, the corresponding threshold is the same as the threshold used for the first source in the earlier conditional block 508. Afterward, control flow of method 500 moves to conditional block 510 to determine whether there are other sources needing reassignment of buffer data storage space.

Figure 6:
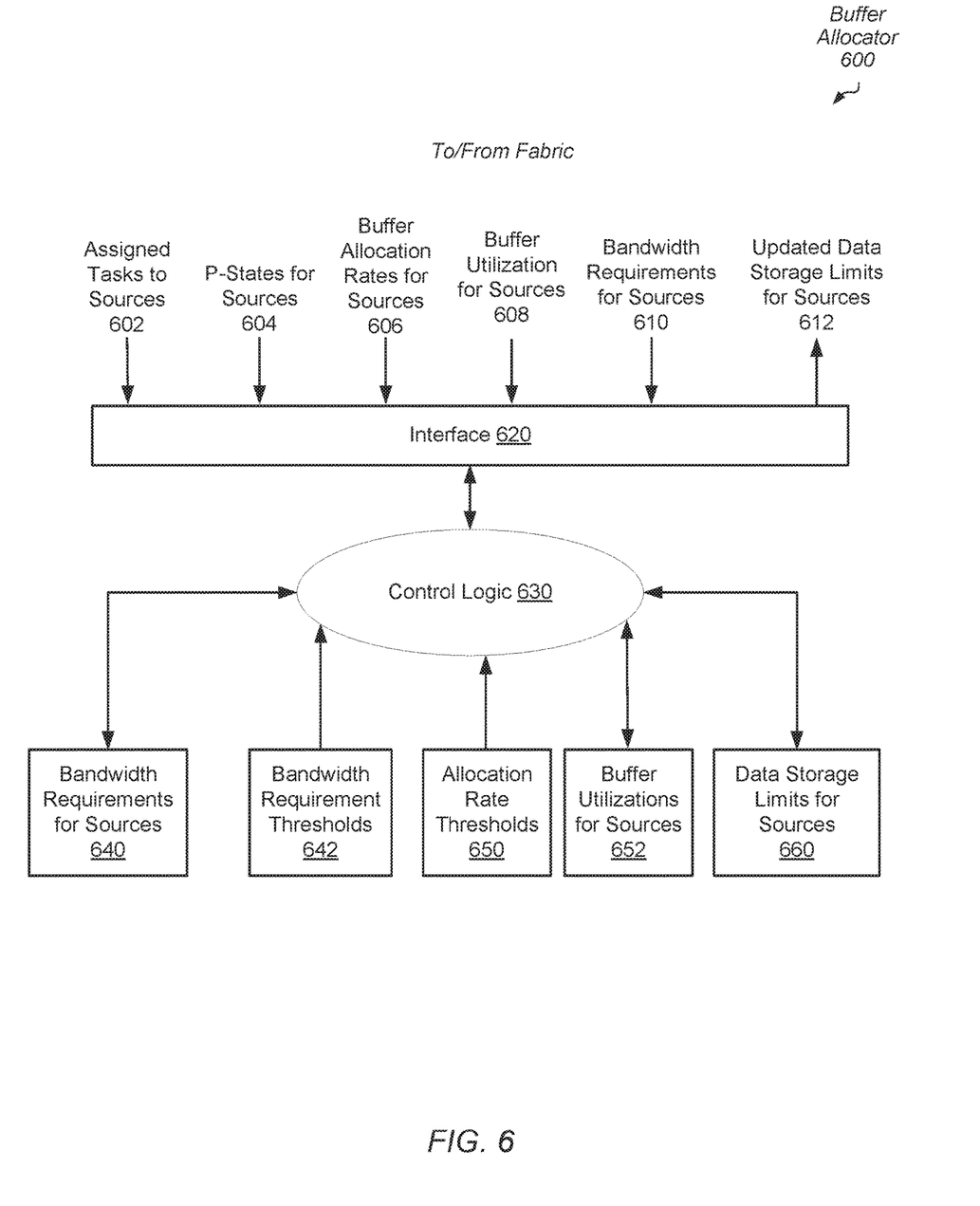
FIG. 6 is a block diagram of one embodiment of a buffer allocator.

Referring to FIG. 6, a block diagram of one embodiment of a buffer allocator 600 is shown. As shown, buffer allocator 600 includes an interface 620 for receiving information from sources such as agents in a computing system. In various embodiments, interface 620 includes fabric interface logic for communicating with a fabric for transferring information with the agents. In the illustrated embodiment, interface 620 receives an indication of assigned tasks to sources 602, power-performance states (P-states) for the sources 604, buffer allocation rates for the sources 606, buffer utilization for the sources 608, and bandwidth requirements for the sources 610. In various embodiments, the information directed at buffers, such as inputs 606 and 608, are directed at buffers within the fabric providing data storage space for the sources. In some embodiments, the buffers are portions of one or more of an upstream data store and a downstream data store in the fabric.

In an embodiment, the operating system provides the indication of assigned tasks to sources 602. The P-states for the sources 604 are provided by a power manager or by the sources. In an embodiment, the bandwidth requirements for the sources 610 is provided by the sources. In some embodiments, the bandwidth requirements for the sources 610 are also used by arbitration logic within the fabric. In some embodiments, each of the sources maintain a respective bus allocation rate and sends this information as input 606 to the buffer allocator 600 via interface 620. Similarly, each of the sources maintain a respective buffer utilization and sends this information as input 608 to the buffer allocator 600 via interface 620.

In one example, an amount of available data storage space in one or more of the upstream data store and the downstream data store is known to a given agent. In an embodiment, the given agent maintains the amount of available data storage space as a data size. In another embodiment, the given agent translates each access of data into a number of multiple transactions, each with a same data size. In one example, a write request for 1 KB is translated into eight write transactions, each with a 128 byte data size. Therefore, the given agent is aware of an amount of the allocated data storage space is to be occupied by outstanding transactions, which is used to determine a buffer utilization for the given agent. In some embodiments, when the data is accessed by the memory controller with a pull message from the memory controller to the upstream data store, one or more of the memory controller and the upstream data store sends a message to the given agent. The message notifies the given agent that the data is removed from the upstream data store. Therefore, the given agent is able to update its local value of the buffer utilization in the upstream data store, and accordingly, the amount of available data storage space in the upstream data store.

As shown, the received information is input to control logic 630. The control logic 630 also receives current stored values of bandwidth requirements for the sources 640, buffer utilizations for the sources 652, and the current assigned data storage limits for the sources 660. Control logic 630 additionally receives bandwidth requirement thresholds 642 and allocation rate thresholds 650. In various embodiments, control logic 630 determines updated data storage limits for the sources 612 and sends them through the fabric to one or more of the sources having their data storage limits updated. The one or more updated data storage limits are also stored in registers or other sequential elements in block 660.

In some embodiments, control logic 630 determines a difference between bandwidth requirements of a first agent generating write requests with write data, which is transported to an upstream data store via the fabric, and a memory controller processing the outstanding transactions generated by the first agent. In an embodiment, control logic 630 determines a rate of allocation of data storage space in the assigned data storage space within the upstream data store for the first agent based on the difference. In another embodiment, the first agent reports the rate of allocation to the buffer allocator 600 as input 606.

In some embodiments, control logic 630 determines whether the rate of allocation exceeds a first threshold by comparing it to one of the thresholds in block 650. Control logic 630 also determines whether an amount of available assigned data storage space in the upstream data store for a second agent exceeds a threshold. If both determinations are true, then control logic 630 reassigns data storage space in the upstream data store from the second agent to the first agent, responsive to further determining a rate of allocation of data storage space in the upstream data store storing outstanding transactions for the second agent does not exceed a threshold. In various embodiments, control logic 630 performs similar steps for data stored in a downstream data store.

Figure 7:
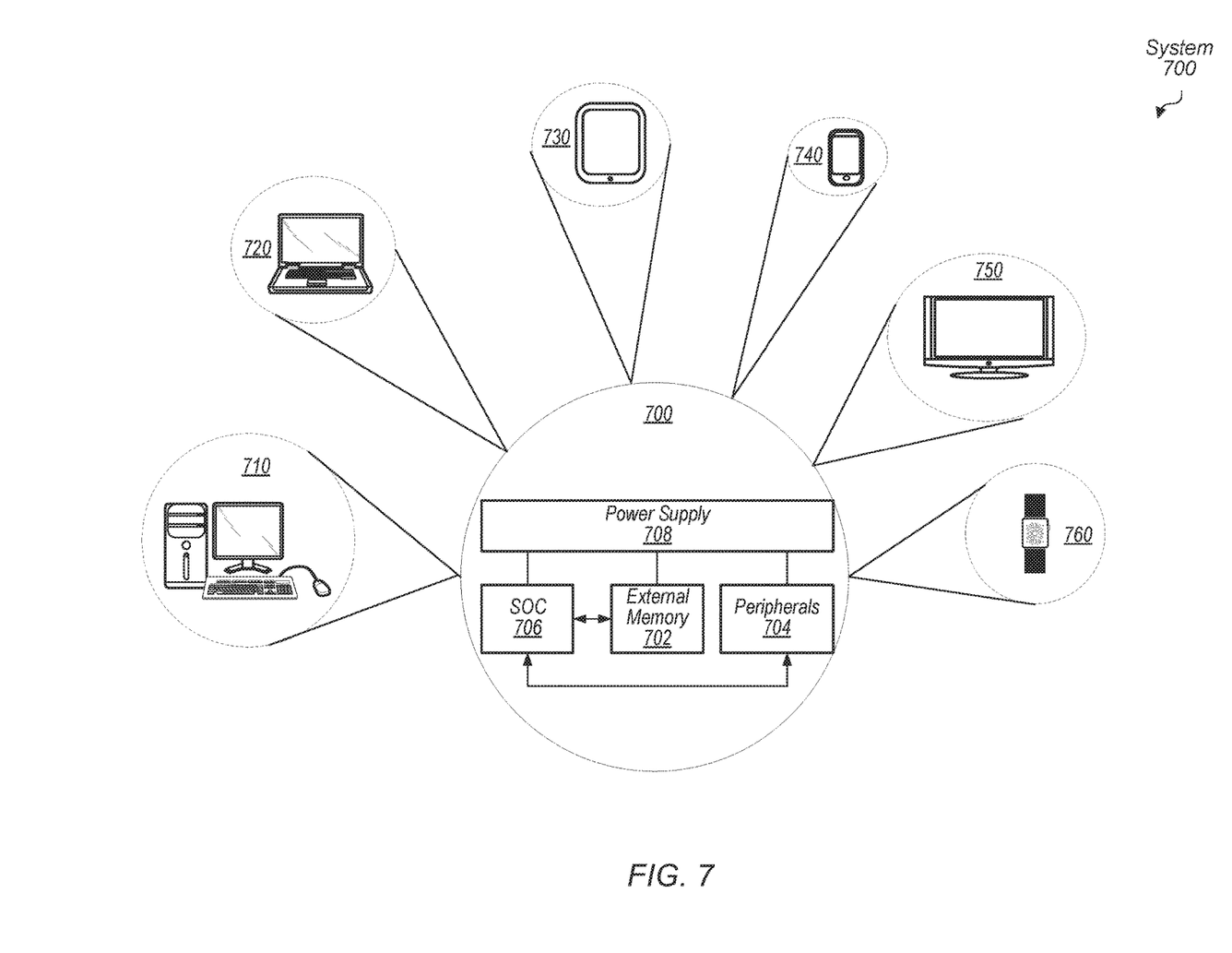
FIG. 7 is a block diagram of one embodiment of a system.

Turning next to FIG. 7, a block diagram of one embodiment of a system 700 is shown. As shown, system 700 represents chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple agents, a communication fabric, one or more data stores, and a controller or manager for dynamically allocating data storage in the data stores for the agents. For example, in some embodiments, SoC 706 includes components similar to computing system 100 (of FIG. 1) and buffer allocator 600 (of FIG. 6). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first interface configured to receive transactions from a plurality of agents including a first agent; and
   circuitry configured to:
   assign a first data storage limit on an amount of data storage space, of one or more buffers in a communication fabric,. that may be used by outstanding transactions of the first agent;
   monitor reception of bandwidth requirements from the communication fabric directed at the first agent; and
   based at least in part on a determination that the reception of bandwidth requirements indicate a bandwidth requirement for the first agent has changed, change a data storage limit of the first agent from the first data storage limit to a second data storage limit different from the first data storage limit.

2. The apparatus as recited in claim 1, wherein the circuitry is further configured to determine a bandwidth requirement for the first agent has changed based on one or more of an indication from an operating system of a workload for the first agent and a power-performance state assigned to the first agent.

3. The apparatus as recited in claim 1, wherein the one or more buffers are configured to store read response data and write data, and wherein the circuitry is further configured to assign to the plurality of agents a first data storage limit for read response data and a second data storage limit for write data.

4. The apparatus as recited in claim 1, wherein the circuitry is further configured to determine a bandwidth requirement for the first agent has changed based on receiving an indication of the bandwidth requirement from the first agent.

5. The apparatus as recited in claim 1, wherein the circuitry is further configured to:
   determine a difference between bandwidth requirements of the first agent and a memory controller processing the outstanding transactions generated by the first agent; and
   determine a rate of allocation of data storage space in the one or more buffers based on the difference.

6. The apparatus as recited in claim 5, wherein the circuitry is further configured to reassign data storage space in the one or more buffers from a third agent to the first agent, in response to:
   determining the rate of allocation exceeds a first threshold; and
   determining an amount of available assigned data storage space in the one or more buffers for the third agent exceeds a second threshold.

7. The apparatus as recited in claim 6, wherein the circuitry is further configured to reassign data storage space in the one or more buffers from the third agent to the first agent, in further response to determining a rate of allocation of data storage space in the one or more buffers storing outstanding transactions for the third agent does not exceed the first threshold.

8. The apparatus as recited in claim 1, wherein the one or more buffers in the communication fabric are comprised within a data store.

9. A method, comprising:
   receiving, by a first interface, transactions from a plurality of agents including a first agent;
   for each agent of the plurality of agents, assigning, by control logic, a data storage limit on an amount of data storage space in one or more buffers in a communication fabric that may be used by outstanding transactions to an initial amount of data storage space; and
   limiting, by control logic, a number of outstanding transactions for one or more of the plurality of agents based on a respective data storage limit;
   monitoring reception of bandwidth requirements from the communication fabric directed at the first agent; and reassigning, by control logic, the data storage limit of the first agent of the plurality of agents to an amount of data storage space different from the initial amount of data storage space, in response to determining that the reception of bandwidth requirements indicate a bandwidth requirement for the first agent has changed.

10. The method as recited in claim 9, further comprising determining a bandwidth requirement for a first agent has changed based on one or more of an indication from an operating system of a workload for the first agent and a power-performance state assigned to the first agent.

11. The method as recited in claim 9, wherein the one or more buffers are configured to store read response data and write data, and wherein the method further comprises assigning to the plurality of agents a first data storage limit for read response data and a second data storage limit for write data.

12. The method as recited in claim 9, wherein the reassigned data storage limit of a first agent is based on an amount of data storage already allocated to the first agent.

13. The method as recited in claim 9, further comprising:
determining a difference between bandwidth requirements of the first agent and a second agent processing the outstanding transactions generated by the first agent; and
determining a rate of allocation of data storage space in the one or more buffers based on the difference.

14. The method as recited in claim 13, further comprising reassigning data storage space in the one or more buffers from a third agent to the first agent, in response to:
determining the rate of allocation exceeds a first threshold; and
determining an amount of available assigned data storage space in the one or more buffers for the third agent exceeds a second threshold.

15. The method as recited in claim 14, further comprising reassigning data storage space in the one or more buffers from the third agent to the first agent, in further response to determining a rate of allocation of data storage space in the one or more buffers storing outstanding transactions for the third agent does not exceed the first threshold.

16. A non-transitory computer readable storage medium storing program instructions, wherein the program instructions are executable by a processor to:
receive transactions from a plurality of agents including a first agent;
for each agent of the plurality of agents, assign a data storage limit on an amount of data storage space in one or more buffers in a communication fabric that may be used by outstanding transactions to an initial amount of data storage space; and
limit a number of outstanding transactions for one or more of the plurality of agents based on a respective data storage limit;
monitor reception of bandwidth requirements from the communication fabric directed at the first agent and
reassign the data storage limit of the first agent of the plurality of agents to an amount of data storage space different from the initial amount of data storage space, in response to determining that the reception of bandwidth requirements indicate a bandwidth requirement for the first agent has changed.

17. The non-transitory computer readable storage medium as recited in claim 16, wherein the program instructions are further executable by a processor to determine a bandwidth requirement for a first agent has changed based on one or more of an indication from an operating system of a workload for the first agent and a power-performance state assigned to the first agent.

18. The non-transitory computer readable storage medium as recited in claim 16, wherein the one or more buffers are configured to store read response data and write data, and wherein program instructions are further executable by a processor to assign to the plurality of agents a first data storage limit for read response data and a second data storage limit for write data.

19. The non-transitory computer readable storage medium as recited in claim 16, wherein the program instructions are further executable by a processor to:
determine a difference between bandwidth requirements of the first agent and a second agent processing the outstanding transactions generated by the first agent; and
determine a rate of allocation of data storage space in the one or more buffers based on the difference.

20. The non-transitory computer readable storage medium as recited in claim 19, wherein the program instructions are further executable by a processor to reassign data storage space in the one or more buffers from a third agent to the first agent, in response to:
determining the rate of allocation exceeds a first threshold; and
determining an amount of available assigned data storage space in the one or more buffers for the third agent exceeds a second threshold.

* * * * *

UNITED STATES PATENT AND TRADEMARK OFFICE
CERTIFICATE OF CORRECTION

PATENT NO. : 10,963,172 B2
APPLICATION NO. : 16/059766
DATED : March 30, 2021
INVENTOR(S) : Chidambaram Nachiappan et al.

Page 1 of 1

It is certified that error appears in the above-identified patent and that said Letters Patent is hereby corrected as shown below:

In the Claims

Column 13, Claim 1, Line 66, please delete "fabric,." and insert -- fabric, --.

Column 16, Claim 16, Line 8, please delete "first agent and" and insert -- first agent; and --.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*